This invention relates to an apparatus of fabricating flexible containers, of the general type disclosed in my patent application S.N. 249,269, filed October 2, 1951, now Patent No. 2,786,238, of which the present application is a continuation in part. The present invention relates particularly to the problem of releasing the container from its dipping mandrel after the container has been fully formed and cured.

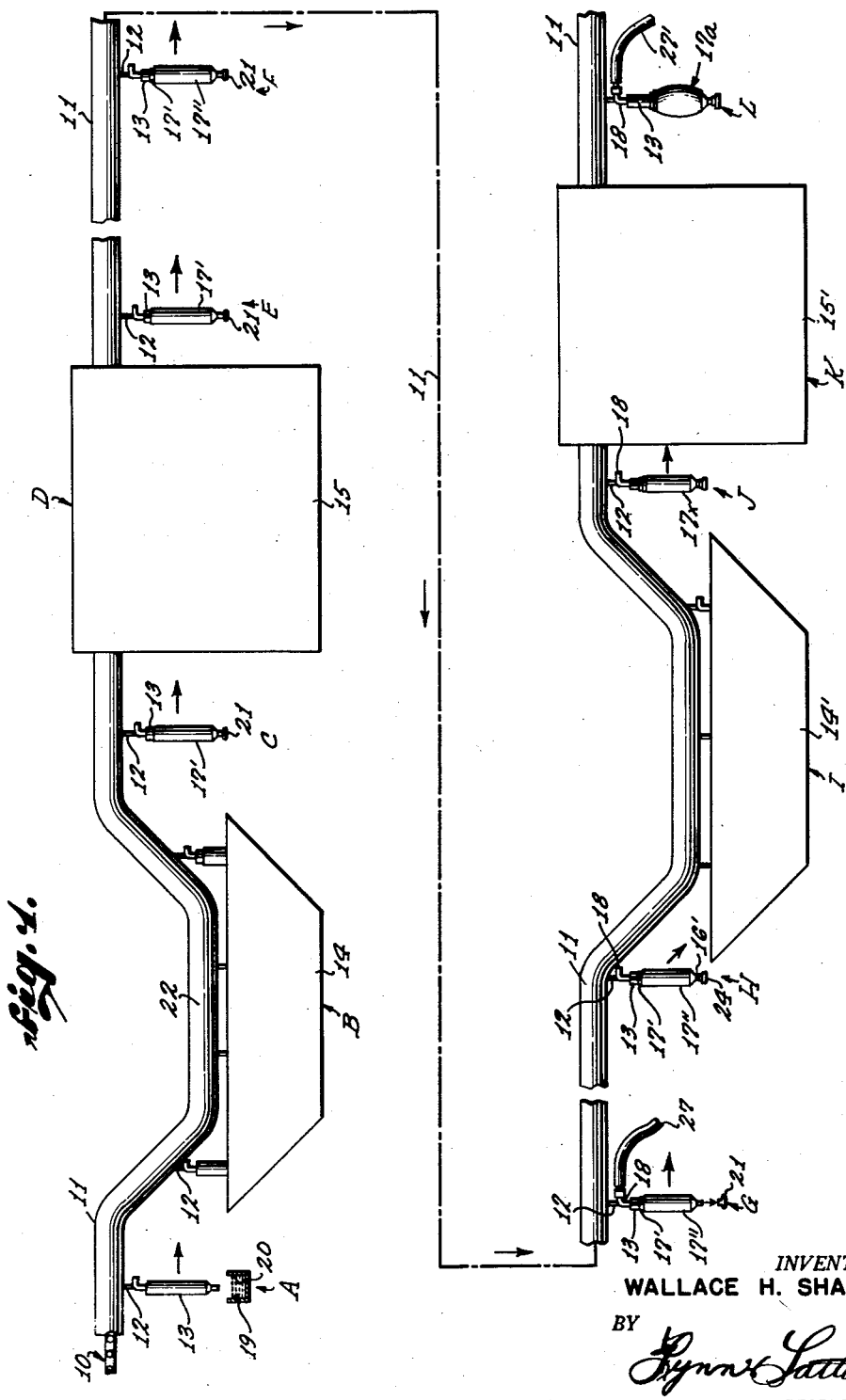

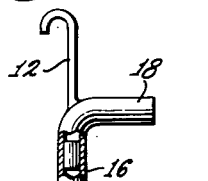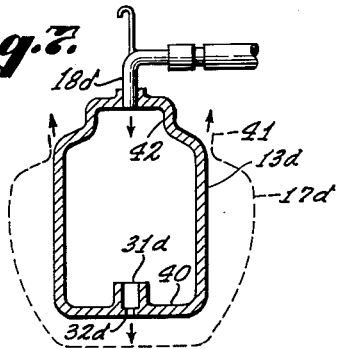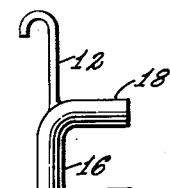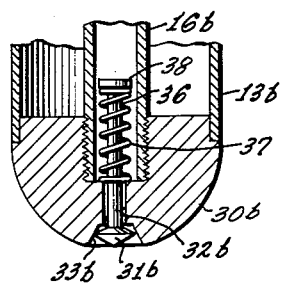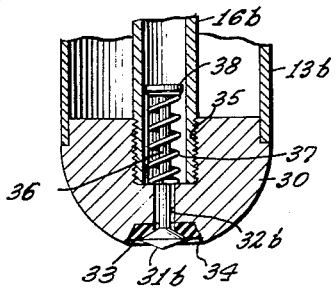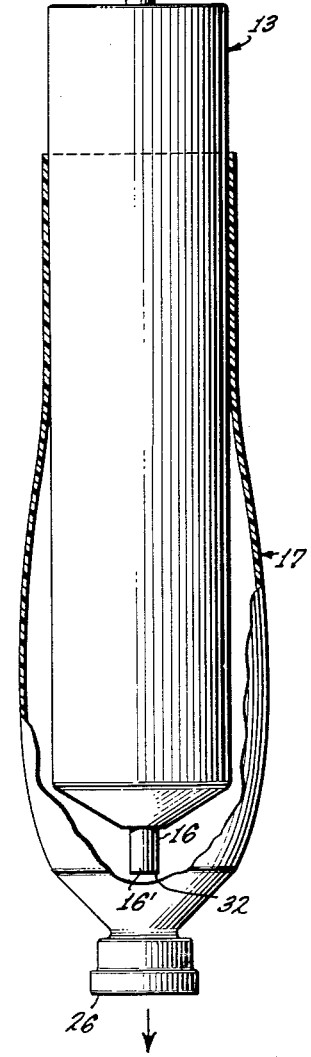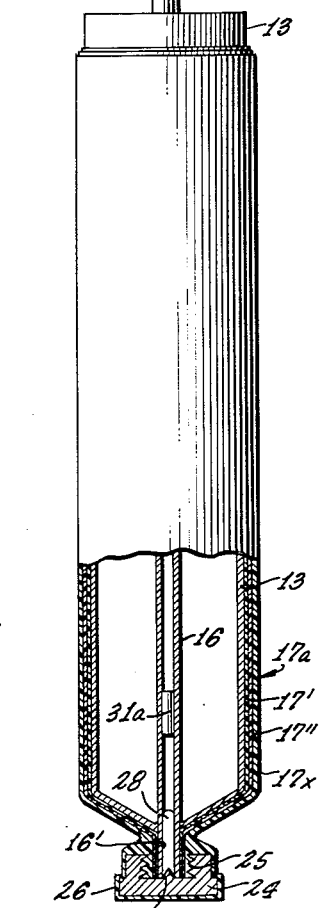
INVENTOR.
WALLACE H. SHAPERO 3,022,540
DIPPING APPARATUS FOR FABRICATING FLEXIBLE CONTAINERS
Wallace H. Shapero, Los Angeles, Calif., assignor, by mesne assignments, to Continental Can Company, Inc., New York, N.Y., a corporation of New York
Filed Oct. 6, 1953, Ser. No. 384,493
1 Claim. (Cl. 18—24)

The general object of the invention is to provide an apparatus of fabricating flexible containers by a dipping method, in which the completed containers are stripped off the mandrel by air pressure inflation through the mandrel.

One of the specific aspects of this problem is maintaining a free passage for injection of air under pressure through the mandrel into the container on the mandrel. A specific object of the present invention is to provide, in an apparatus in which containers are formed upon mandrels by dipping the mandrels into a bath of liquid plastic material, a means whereby an air outlet in the mandrel may be kept open (free from clogging by the plastic material) whereby, in a final stage of operation, air may be injected through the mandrel to inflate the container and eject it from the mandrel.

Other objects will become apparent in the ensuing specifications and appended drawings in which:

FIG. 1 is a diagram illustrating a method of fabricating a flexible container, utilizing the invention;

FIG. 2 shows a detail sectional view of the tip of a mandrel such as is shown in FIG. 1;

FIG. 3 is a view, partially in section, of a mandrel embodying the invention, with a completed container formed thereon;

FIG. 4 is a side view, partially in section, of a mandrel embodying a modified form of the invention;

FIG. 5 is a fragmentary sectional view of a mandrel embodying another modified form of the invention;

FIG. 6 is a fragmentary sectional view of a mandrel embodying a further modified form of the invention; and FIG. 7 is a fragmentary sectional view of a mandrel embodying a still further modified form of the invention.

*The method, in general*

In general, the invention provides a method whereby flexible containers may be fabricated by dipping a series of mandrels into one or more dipping baths so as to provide on each mandrel a coating or series of coatings which, upon curing, become flexible containers. As one of the final steps in this process, air is injected under pressure through the flexible mandrels to inflate the containers and eject them from the mandrels.

Referring now to FIG. 1, there is shown therein, schematically, the major steps in the process of forming the mandrels. The invention utilizes an apparatus which is broadly conventional in that it includes an endless chain conveyor 10, travelling in and supported by a track 11, and a series of hangers 12, from which are suspended mandrels 13 which are dipped into one or more tanks 14, 14′ in the course of travel of the conveyor, and which are carried through one or more curing ovens 15, 15′, in which the coatings or films of liquid coating material which are picked up by the mandrels in the dipping baths contained in tanks 14, 14′, are cured and hardened.

FIGS. 3–7 inclusive show various forms of mandrels embodying the invention, which may be used in the practice of the method of my invention. For example, FIG. 3 illustrates a mandrel 13 having at its upper end a hanger 12 and having at its lower end an outlet opening 32 through which are may be injected under pressure into a container 17 which has been formed by dipping the mandrel into one or more baths of liquid plastic material, the air pressure inflating the container as shown and ejecting it from the mandrel, as indicated by the arrow. Preferably, the air is injected into the container near the closed end thereof and is forced to escape upwardly between the mandrel and the open skirt portion of the container 17, whereby a film of compressed air is interposed between the container and the surface of the mandrel to break the frictional engagement of the container with the mandrel throughout the entire inner area of the container. In this action, even the open upper end of the container is stretched to a larger diameter than the mandrel diameter, by the escaping film of air and accordingly, the container is easily blown off the mandrel.

The air is injected into the mandrel at its upper end through a fitting 18 which may constitute the laterally bent extension of a tube 16 extending axially through the mandrel from one end to another, the lower end of tube 16 projecting from the bottom of the mandrel to provide a neck 16′ defining outlet opening 32.

*Method of maintaining air passage open*

A specific aspect of the invention is the prevention of clogging of the outlet opening 32 by the liquid plastic material when the mandrel is dipped in the bath. In general, the invention contemplates the plugging of the tube 16 so that the liquid plastic material cannot rise therein. The specific methods of doing this, contemplated by the invention, include:

(1) Plugging the lower end of tube 16 by means of a removable plug of material, which may be formed by dipping the neck 16′ into a hot melt;

(2) Closing the lower end of the tube 16 by a valve adapted to be opened by the pressure of air in the tube, but normally closed;

(3) Closing the tube at an intermediate or upper area by means of a valve, whereby to provide in the lower portion of the tube an air column which will resist upward movement of the dipping solution into the tube.

FIG. 1 specifically illustrates the first of these methods. A mandrel 13, supported upon and travelling with conveyor 10, past a station A where a hot melt 19 of sealing material, contained in a cup or other container 20, is applied to the neck 16′ by simply lifting the container 20 upwardly until the neck 16′ is immersed in the melt 19. This leaves a small plug 21 of sealing material closing the neck 16′, as shown in FIG. 2.

After the plug 21 has been applied, the mandrel 13 moves downwardly in a downwardly arched portion 22 of conveyor 11, and is dipped into a bath of liquid plastic material in tank 14 at station B. Thus the mandrel becomes coated with a film of liquid plastic material, which becomes the inner coating of the laminated container 17a shown in FIG. 4. This inner coating may, for example, be chemically resistant to solvent such as may be contained in the contents of the container when the same is filled.

At station C, the mandrel, with the initial coating 17′ thereon, has been lifted out of tank 14, and is progressing toward oven 15 in which this inner coating is cured, at station D.

At station E, the mandrel, with coating 17′ cured thereon, is approaching a second dipping tank (not shown) in which an intermediate coating 17″ is applied over coating 17′.

At station F, the mandrel, with the second coating 17″ thereon, is shown approaching a second oven (not shown) in which this second coating is cured.

A particularly container which is being fabricated in the operation shown in FIG. 1, is a flexible tube type container (e.g. toothpaste or cold cream tube) having a cap 24 threaded onto a threaded neck 25 which is formed integrally with container 17a. Mandrel neck 16′ functions to shape the passage through neck 25. A very thin film of plastic material 26 covers the cap 24 and is integral with the outermost layer 17x of the laminated container 17a. In order to obtain a desired color contrast between the container body and the cap (e.g. it is often desirable to have the container body white and the cap a dark color), the outer film 17x is preferably of a transparent material. Accordingly, it is preferred, in the three coating process for making such a flexible tube container, to apply the cap 24 after the mandrel has been coated with the inner and intermediate laminae 17′, 17″. Just prior to application of the cap 24, the tube 16′ is cleared by removing therefrom the plug 21, as indicated at station G in FIG. 1. This may be done by applying an air hose 27 to fitting 18 and blowing out the plug 21, or the plug may simply be picked out by the fingernails of an operator at station G.

At station H, cap 24 has been applied to the mandrel, as by inserting a stem 28, integral with cap 24, into the neck 16′ (FIG. 4).

At station I, the mandrel has been dipped into the last bath, contained in tank 14′, to deposit thereon the outer coating 17x. At the lower end of the mandrel, this coating enters the cavity of the inverted cap 24 and fills the same to form the screw threaded neck 25.

At station J the mandrels have been lifted out of tank 14′ and are approaching the final curing oven 15′, in which the outer coating is cured at station K.

At station L the completed container is being ejected from the mandrel by applying an air hose 27′ to fitting 18 and injecting air under pressure through tube 16′ into the container, the outlet 32 having been cleared to insure adequate passage of air therethrough into the container. The ejecting operation is as previously described and illustrated in FIG. 3.

Valving arrangements

As previously indicated, an alternative method of preventing the entry of the liquid plastic material into the air injection tube is to block the tube by means of a valve. FIGS. 5 and 6 illustrate mandrels 13b having valves at their lower ends. These forms of mandrel are particularly adaptable for the fabrication of containers having closed, integral bottoms (e.g. of semispherical shape). Accordingly, the mandrel 13b, shown in these two figures, has a bottom member 30 providing a mounting and seat for a valve 31b therein. The lower end of air pressure tube 16b is mounted in bottom member 30 in any suitable manner, as by threading it into a counterbore 35 therein, communicating with an outlet port 32b leading to the valve seat. In FIG. 5, the valve seat comprises an annular insert 33 of tough, slightly yieldable material, such as the resin known commercially as "Teflon," seated in a counterbore 34 in bottom member 30. Valve 31b has a stem 35 extending upwardly through port 32b and into tube 16b. The valve spring 37 is engaged against the bottom of counterbore 35 and against a head 38 on the end of stem 36, to yieldingly maintain valve 31 seated against valve seat 33. Application of air pressure to tube 16b forces valve 31b off its seat and the air is injected through the open counterbore 34 into the container to eject the latter from the mandrel.

FIG. 6 shows a slightly modified form of this valving arrangement, in which valve 31b seats directly against a conical valve seat 33b formed in bottom member 30b.

FIG. 4 illustrates a valve 31a located in tube 16 upwardly of the lower end thereof. Valve 31a, being a check valve, opening downwardly like valve 31, traps a column of air in the lower portion of tube 16 which resists entry of the liquid plastic material into the outlet 32. Valve 31a allows the air to pass downwardly through tube 16 for inflating the container.

As illustrated in FIG. 3, a valve may be located near the upper end of tube 16. Such valve is also a downwardly opening check valve which allows downward flow through the tube 16 but is normally closed to trap in the tube 16 a column of air which resists ascension of the liquid plastic material into the neck 16′.

Modified mandrel

FIG. 7 illustrates how the invention may be applied to the manufacture of containers having closed integral bottoms and restricted necks, such as are commonly used for the storage of canned fruit, vegetables, etc. FIG. 7 particularly illustrates a mandrel 13d having a shape for forming a container in the general form of a mason jar, or the like. The mandrel 13d has a bottom 40 provided with a downwardly opening check valve 31d therein, and having at its upper end a narrowed neck portion 42 for forming the narrowed neck of the container which is illustrated schematically in broken lines at 17d. FIG. 7 also illustrates that it is possible to eliminate the air pressure tube extending axially through the mandrel, and to simply utilize an outlet aperture 32d in bottom 40 and an inlet fitting 18d in the form of an elbow tube anchored in the top of the mandrel. The air passes through the mandrel and is discharged through valve 31d to inflate container 17d.

I have discovered that even a container with a narrowed neck (e.g. neck 41) can be removed from the mandrel by stretching the neck 41 and sliding it downwardly over the maximum diameter of the mandrel, through the use of the inflation process of my invention. The receptacle must of course be of resilient, stretchable material having the general characteristics of soft rubber (some of the thermoplastic materials such as the vinyl resins, when properly plasticized, have this general characteristic). Where the containers are formed from this type of material, it is possible, by using sufficient air pressure, to inflate them to the point where the neck 41 will stretch sufficiently to pass over the major diameter of the mandrel 13d. Thereupon the container is ejected from the mandrel in the same manner as in the other forms of the invention.

The container of FIG. 4

FIG. 4 illustrates an improved container fabricated by the method and apparatus of this invention. It embodies a wall of laminated structure including a minimum of three layers, integrally united throughout the entire area of the wall structure, and fabricated by a succession of dipping steps, the last of which is followed by the air pressure ejection step described above.

Outer layer 17x provides the body of the container wall and is of a synthetic organic resin plastic material, highly plasticized to attain a high degree of toughness and flexibility, and having as the basic resin, a synthetic thermoplastic organic resin such as a polyvinyl chloride or a copolymer of polyvinyl chloride and another resin. The copolymer is preferred. Copolymers which may be used are:

Polyvinyl chloride-acetate copolymer;
Polyvinyl chloride-vinylidene copolymer;
Polyvinyl chloride-maleate copolymer;
Polyvinyl chloride-acrylonitrile copolymer.

In the copolymer the polyvinyl monomer is preponderant, its percentage of the total basic resin being 90% or greater, and that of the other monomer being 10% or less, preferably 5%.

The interior layer 17′, which constitutes the lining of the container, is of a heat sealable material, preferably a thermoplastic resin which is closely related chemically to the material of the outer body layer 17x (e.g. selected from the group of copolymers listed above). This layer is only slightly plasticized and is accordingly fairly hard in texture. It has the characteristic of heat sealing or bonding to itself when subjected to the action of heated dies or rollers, whereby the open bottom of the tube may be sealed after the contents have been inserted, the sealing being accomplished simply by pressing opposed portions of the lining 17′ against each other between heated jaws or rollers and causing the contacting surfaces to become welded to one another. Preferably, the basic resin of the lining layer 17′ is the same as that of the body layer 17x.

The intermediate layer 17″ likewise comprises a basic resin which is closely related chemically to that of the two outer body layers 17x, in the same sense as the lining, and preferably utilizes the same basic resin as that of the body layer and the lining. This provides maximum certainty of integral bonding of the three layers one to another as they are successively deposited on the mandrel and on one another by the dipping steps. In addition to the basic thermoplastic resin, the intermediate layer 17″ includes a minor percentage of a thermosetting resin, such as urea formaldehyde, phenol formaldehyde, di-ethylene glycol, di-methacrylate, or a complex polymer of epoxy-bisthenol compounds commonly known as "Epon" resin. The percentage of the thermosetting resin may range from 5% to 10% of the total resin content in layer 17″.

The addition of the thermosetting resin imparts to the middle layer 17″ a high resistance to chemical deterioration, whereby the middle layer may function as a barrier layer, arresting the migration of plasticizer from the outer body layer 17x into the two inner layers and, conversely, arresting any migration of oils or other solvents of the container contents outwardly into the body layer 17x.

Plasticizers which may be used in the body layer 17x are: di-2-ethyl hexyl phthalate; di-iso-octyl hexyl phthalate; di-2-ethyl hexyl tetra phthalate. The plasticizer content in body layer 17x may range as high as 40% of the total content of this layer. A similar plasticizer (i.e. one of the materials listed above, with the addition of a polymeric alkyd plasticizer such as that known commercially as "Paraplex G–40" as sold by Rohm and Haas, may be used for the interior layer 17′, the percentage being much lower (i.e. 10% or less). The plasticizer for the intermediate layer 17″ may comprise simply the "G–40" material referred to above.

The inner layer 17′ and 17″ have an aggregate thickness which may range from 10% to 25% of the total thickness of the container wall structure. The interior layer may range from 5% to 10% of total thickness; the middle layer from 5% to 15% of total thickness. A preferred ratio of thickness is: interior layer 17′—5%; intermediate layer 17″—10%; body layer 17x—85%.

Because of the low percentage of plasticizing of the two inner layers, they are relatively stiff, despite their thinness, and lend to the container a desirable degree of form retention, considerably more than the extreme limpness which would characterize the outer body layer 17x without the support of the inner layers. Nevertheless, the extremely high degree of integral bonding between the three layers provides for an intimate support of the two inner layers by the body layer 17x, such as to render the tube quite flexible and resistant to rough usage, without cracking of the inner layers. For example, the container may be distended in the ejection step so as to freely slide off the mandrel, without damaging the relatively stiff inner layers.

I claim:

Apparatus for fabricating flexible containers of a type having multiple layers of synthetic resin organic plastic material, comprising: a flexible conveyor; means supporting said conveyor for linear generally horizontal travel and for dipping stages of movement in said path of linear travel; a plurality of dip-tanks for holding respective solutions of resin to form respective layers collectively constituting the wall structure of a flexible container; a plurality of mandrels each comprising a hollow tubular body having an upper end provided with means for releasably suspending the mandrel from said conveyor, having an air passage extending longitudinally therethrough, and having a lower end provided with an outlet constituting the lower extremity of said air passage, for ejecting air into a container formed on said mandrel by dipping the same into said solution of container forming material, and an injection fitting formed as the upper end of said air passage and extending laterally from the longitudinal axis of the mandrel below the upper end of said suspending means whereby an air nozzle may be applied to said fitting while the mandrel remains suspended on said conveyor, with the conveyor continuing said linear travel, for blowing a formed container off of the mandrel while it remains suspended.

References Cited in the file of this patent

UNITED STATES PATENTS

| | | |
|---|---|---|
| Re. 21,094 | Brating | May 23, 1939 |
| 2,123,155 | Groff | July 5, 1938 |
| 2,299,269 | Gammeter | Oct. 20, 1942 |
| 2,320,583 | Forro | June 1, 1943 |
| 2,338,827 | Teague et al. | Jan. 11, 1944 |
| 2,461,270 | Habib et al. | Feb. 8, 1949 |
| 2,461,271 | Habib et al. | Feb. 8, 1949 |
| 2,568,128 | Morris | Sept. 18, 1951 |
| 2,694,830 | Pollock | Nov. 23, 1954 |
| 2,786,238 | Shapero | Mar. 26, 1957 |